United States Patent
Kondo et al.

(10) Patent No.: US 9,924,477 B2
(45) Date of Patent: Mar. 20, 2018

(54) NODE AND METHOD FOR COMMUNICATION CONTROL

(71) Applicant: FUJITSU LIMITED, Kawasaki-shi, Kanagawa (JP)

(72) Inventors: Taiji Kondo, Chiba (JP); Takao Ito, Kawasaki (JP); Takahiro Koharagi, Tokyo (JP); Satoshi Ikeda, Tokyo (JP); Mitsuaki Yasuoka, Tokyo (JP); Kobun Nakajima, Tokyo (JP); Satoshi Kurosawa, Tokyo (JP); Shigemasa Matsubara, Tokyo (JP); Naoto Miyauchi, Tokyo (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 14/474,683

(22) Filed: Sep. 2, 2014

(65) Prior Publication Data

US 2014/0369342 A1 Dec. 18, 2014

Related U.S. Application Data

(63) Continuation of application No. PCT/JP2013/055749, filed on Mar. 1, 2013.

(30) Foreign Application Priority Data

Mar. 2, 2012 (JP) .................................. 2012-047360

(51) Int. Cl.
*H04J 3/06* (2006.01)
*H04W 56/00* (2009.01)
*H04W 84/18* (2009.01)

(52) U.S. Cl.
CPC ......... *H04W 56/001* (2013.01); *H04J 3/0655* (2013.01); *H04W 56/002* (2013.01);
(Continued)

(58) Field of Classification Search
CPC ... H04W 4/00; H04W 56/00; H04W 56/0015; H04W 56/003; H04W 56/0035;
(Continued)

(56) References Cited

U.S. PATENT DOCUMENTS

| 5,276,659 | A | 1/1994 | Kotaki |
| 7,986,718 | B2 * | 7/2011 | Monier ................. G01D 4/004 370/255 |

(Continued)

FOREIGN PATENT DOCUMENTS

| CN | 102348277 A | 2/2012 |
| JP | 03-296684 | 12/1991 |

(Continued)

OTHER PUBLICATIONS

International Search Report dated May 7, 2013 in corresponding application PCT/JP2013/055749.
(Continued)

*Primary Examiner* — Ian N Moore
*Assistant Examiner* — Phong La
(74) *Attorney, Agent, or Firm* — Staas & Halsey LLP

(57) ABSTRACT

A node includes a time difference measurement unit and a time setting unit. The time difference measurement unit measures a time difference between a first time based on latest received time information and a second time based on second-latest received time information. The time setting unit calculates an adjustment time difference when the time difference exceeds an allowable range of error that is smaller than an allowable range of maintainable communication, sets a time obtained by adding the adjustment time difference and the second time to the time of the node when the adjustment time difference is within the allowable range of maintainable communication, and sets a time obtained by adding a time difference corresponding to the allowable (Continued)

range of maintainable communication and the second time to the time of the node when the adjustment time difference exceeds the allowable range of maintainable communication.

2 Claims, 8 Drawing Sheets

(52) U.S. Cl.
CPC ... *H04W 56/0015* (2013.01); *H04W 56/0035* (2013.01); *H04W 84/18* (2013.01)

(58) Field of Classification Search
CPC . H04W 56/0075; H04W 48/18; H04W 56/02; H04W 84/18; H04L 7/00; H04L 7/0004; H04L 7/0016; H04J 3/0655
See application file for complete search history.

(56) References Cited

U.S. PATENT DOCUMENTS

| | | | | |
|---|---|---|---|---|
| 8,086,249 | B1* | 12/2011 | Dinan | ............... H04W 56/0005 370/350 |
| 2005/0195772 | A1 | 9/2005 | Nishikawa et al. | |
| 2008/0258863 | A1* | 10/2008 | Vrielink | .................... G01S 5/02 340/5.2 |
| 2010/0020745 | A1* | 1/2010 | Agulnik | .............. H04W 76/002 370/328 |
| 2011/0292109 | A1* | 12/2011 | Fosas | ................... B41J 2/04573 347/11 |
| 2013/0144858 | A1* | 6/2013 | Lin | ................... G06F 17/30864 707/709 |
| 2013/0159554 | A1* | 6/2013 | Kim | ................. H04W 56/0055 709/248 |
| 2013/0183905 | A1* | 7/2013 | Richardson | ....... H04W 56/0015 455/67.11 |

FOREIGN PATENT DOCUMENTS

| | | |
|---|---|---|
| JP | 2003-273849 | 9/2003 |
| JP | 2005-072677 | 3/2005 |
| JP | 2005-286998 | 10/2005 |
| JP | 2006-079316 | 3/2006 |

OTHER PUBLICATIONS

Chinese Office Action dated Jun. 1, 2017 in corresponding Chinese Patent Application No. 201380012009.8.

* cited by examiner

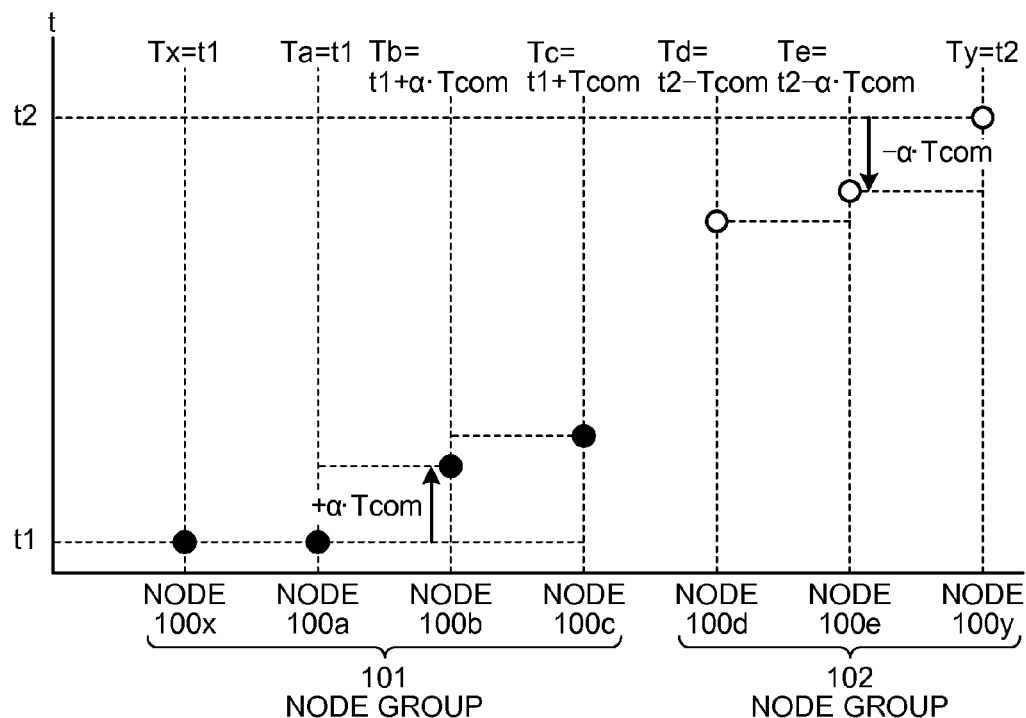
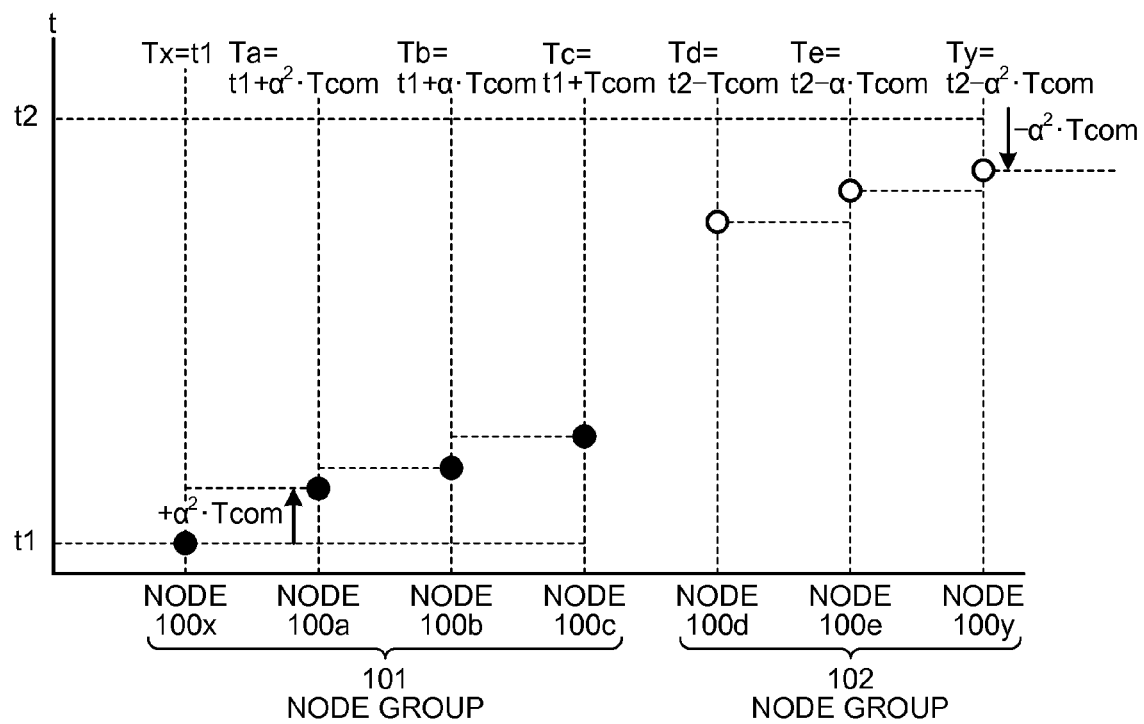

NODE AND METHOD FOR COMMUNICATION CONTROL

CROSS-REFERENCE TO RELATED APPLICATION

This application is a continuation of International Application No. PCT/JP2013/055749, filed on Mar. 1, 2013 which claims the benefit of priority of the prior Japanese Patent Application No. 2012-047360, filed on Mar. 2, 2012, the entire contents of which are incorporated herein by reference.

FIELD

The embodiment discussed herein is related to a node and a method for communication control.

BACKGROUND

In recent years, a study of an ad hoc network has been progressed in which a plurality of communication apparatuses each referred to as a node are connected with each other in an autonomous distributed manner. In the ad hoc network, a time synchronization source that is a node holding a reference time used for time synchronization between nodes is provided, and times are synchronized among nodes using the time synchronization source as a center.

The time synchronization source is, for example, a node that receives a time from a time calibration server (NTP server) provided on the network, or a node that is directly connected with a handy terminal (HT) used for the meter-reading of data and sets a time of the present node. When a node that is directly connected with the HT serves as a time synchronization source, the node acquires and holds the time of the HT as a reference time. Furthermore, each node on the ad hoc network sets the time of the present node based on a reference time included in time information propagated sequentially from a node that is the time synchronization source. In this manner, in a network formed in conjunction with ad hoc communication, a node group including a plurality of nodes synchronized with one node that is the time synchronization source for each network formed is formed. That is, in the network formed in conjunction with the ad hoc communication, an independent node group is formed with respect to a node that is the independent time synchronization source.

Here, in the network formed in conjunction with the ad hoc communication, when a plurality of ad hoc networks are brought into contact with each other, communication is performed across the boundary of each ad hoc network. However, when nodes belonging to the respective ad hoc networks have the respective times different from each other, the nodes are incapable of communicating with each other. For example, to consider a case where each of a plurality of ad hoc networks has a node that is a time synchronization source based on a time acquired from an HT, when a time acquired from an HT and a time acquired from the other HT are different from each other, reference times of the nodes each of which is a time synchronization source that acquires a time from an HT are different from each other and hence, node groups connected with different time synchronization sources are incapable of communicating with each other. Therefore, in order for a plurality of ad hoc networks to communicate with each other, synchronizing times among a plurality of node groups is performed.

As a technique that synchronizes in terms of times among a plurality of node groups connected with different time synchronization sources, there has been proposed a technique that sets priorities to the node groups, and synchronizes a node positioned at the boundary among the node groups in terms of a time with the highest priority node group (see Japanese Patent No. 3865223). In this technique, a node synchronized in terms of a time with the other highest priority node group also transmits the time after synchronization to a node adjacent thereto in the node group thereof. Accordingly, synchronization in terms of times among a plurality of node groups can be achieved with the highest priority node group.

In the above-mentioned conventional technique, a node is synchronized in terms of a time with one of the time synchronization sources and hence, times among nodes with the identical time synchronization source can be synchronized with each other and the nodes can communicate with each other. However, there arises a difference in time between a node that changes the time synchronization source thereof and each node belonging to the node group synchronized in terms of a time with a time synchronization source before the change depending on the difference in time between the time synchronization sources and hence, there has been a drawback that the communication with a node previously capable of communicating becomes impossible by changing the time synchronization source.

SUMMARY

According to an aspect of an embodiment, a node in an ad hoc network constituted of nodes each of which sets a time thereof based on time information propagated sequentially from a time synchronization source includes a time difference measurement unit that measures a time difference that is a difference between a first time based on latest received time information and a second time based on second-latest received time information; and a time setting unit that calculates an adjustment time difference by multiplying the time difference by a predetermined rate when the time difference exceeds an allowable range of error that is smaller than an allowable range of maintainable communication, sets a time obtained by adding the calculated adjustment time difference and the second time to the time of the node when the calculated adjustment time difference is within the allowable range of maintainable communication, and sets a time obtained by adding a time difference corresponding to the allowable range of maintainable communication in place of the calculated adjustment time difference and the second time to the time of the node when the calculated adjustment time difference exceeds the allowable range of maintainable communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view (No. 3) illustrating one example of processing that a node sets a time of the present node in the ad hoc network according to the present embodiment;

FIG. 7 is a view (No. 4) illustrating one example of processing that a node sets a time of the present node in the ad hoc network according to the present embodiment;

DESCRIPTION OF EMBODIMENT

Preferred embodiment of the present invention will be explained with reference to accompanying drawings. Here, a technique disclosed herein is not limited to the embodiment.

Figure 1:
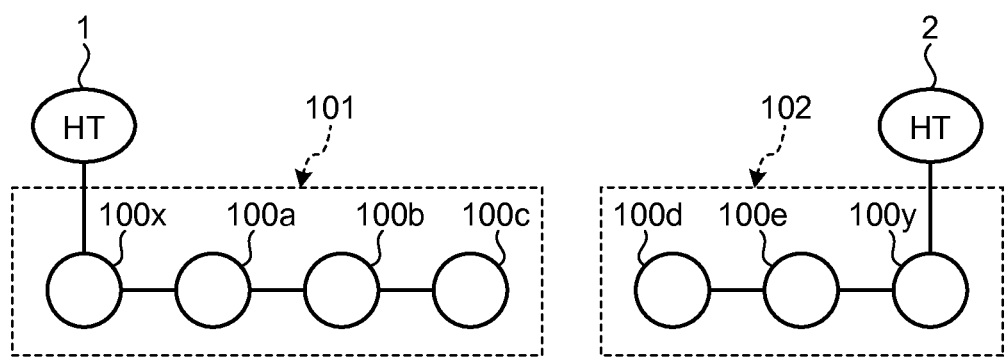
FIG. 1 is a view for explaining a constitution of an ad hoc network according to the present embodiment.

First of all, a constitution of an ad hoc network according to the present embodiment is explained. FIG. 1 is a view for explaining the constitution of the ad hoc network according to the present embodiment. As illustrated in FIG. 1, the ad hoc network has nodes 100a to 100e, 100x, and 100y. Each of the node 100x and the node 100y holds a reference time used for time synchronization among nodes. For example, the node 100x is connected with an HT 1, and acquires and holds a time of the HT 1 as a reference time. The node 100y is connected with an HT 2, acquires and holds a time of the HT 2 as a reference time. Each of the node 100x and the node 100y is one example of a time synchronization source. Hereinafter, the node 100x and the node 100y each of which is the time synchronization source are described as time synchronization source nodes 100x and 100y, respectively.

Each of the nodes 100a to 100e sets a time of the present node based on a reference time included in a time synchronization frame that is time information propagated sequentially from a time synchronization source. For example, the node 100a receives a time synchronization frame sent from the time synchronization source node 100x, and sets the time of the present node 100a based on the reference time included in the received time synchronization frame. The node 100b receives a time synchronization frame sent from the node 100a, and sets the time of the present node 100b based on the reference time included in the received time synchronization frame. The node 100c receives a time synchronization frame sent from the time synchronization source node 100b, and sets the time of the present node 100c based on the reference time included in the received time synchronization frame. Accordingly, a node group 101 including the nodes 100a to 100c that are synchronized with the time synchronization source node 100x is formed.

Furthermore, for example, the node 100e receives a time synchronization frame sent from the time synchronization source node 100y, and sets the time of the present node 100e based on the reference time included in the received time synchronization frame. The node 100d receives a time synchronization frame sent from the node 100e, and sets the time of the present node 100d based on the reference time included in the received time synchronization frame. Accordingly, a node group 102 including the nodes 100d and 100e that are synchronized with the time synchronization source node 100y is formed.

Here, in a network formed in conjunction with ad hoc communication, when a plurality of ad hoc networks contact each other, communication is performed across the boundary of each ad hoc network. However, when nodes belonging to the respective ad hoc networks are different from each other in terms of times thereof, the nodes are incapable of communicating with each other. For example, to consider a case where each of a plurality of ad hoc networks has a node that is a time synchronization source based on a time acquired from an HT, when a time acquired from an HT and a time acquired from the other HT are different from each other, reference times of the nodes each of which is the time synchronization source that acquires a time from an HT are different from each other and hence, node groups different from each other in terms of time synchronization sources are incapable of communicating with each other. In the example illustrated in FIG. 1, the HT 1 and the HT 2 are different from each other in terms of times thereof. In this case, a reference time of the time synchronization source node 100x that acquires a time from the HT 1 and a reference time of the time synchronization source node 100y that acquires a time from the HT 2 are different from each other and hence, the node group 101 and the node group 102 are incapable of communicating with each other. Therefore, in order for a plurality of ad hoc networks to communicate with each other, it is desirable to synchronize a plurality of node groups in terms of times thereof.

In order to synchronize times among node groups different from each other in terms of time synchronization sources, it is also considered to adopt a conventional technique that sets priorities to the node groups and, at the same time, synchronizes a node positioned at the boundary of one of the node groups in terms of a time with the other node group that has a higher priority. In the conventional technique, a node is synchronized in terms of a time with one of the time synchronization sources and hence, times among nodes with the identical time synchronization source can be synchronized with each other and the nodes can communicate with each other. However, in the conventional technique, there arises a difference in time between a node that changes the time synchronization source thereof and each node belonging to the node group synchronized in terms of a time with a time synchronization source before the change depending on the difference in time between the time synchronization sources and hence, there has been the risk that the communication with a node previously capable of communicating becomes impossible by changing the time synchronization source.

Accordingly, in the present embodiment, each node 100 measures a time difference between a reference time included in latest time information received from a node adjacent thereto and a reference time included in second-latest time information received from the node adjacent thereto. Furthermore, each node 100 determines whether the time difference is within an allowable range of error that is smaller than an allowable range of maintainable communication, and sets the time of the present node to a time different from the reference time depending on the result of determination. Here, the allowable range of maintainable communication indicates a range of the time difference in which communication with an adjacent node is maintainable, and the allowable range of error indicates a range of the time difference in which an error of communication with an adjacent node can be suppressed to an allowable level.

For example, the node 100c measures a time difference between a reference time included in a time synchronization frame received from the node 100b and a reference time included in a time synchronization frame received from the node 100d. When the time difference exceeds the allowable range of error, the node 100c calculates an adjustment time difference by multiplying the time difference by a predetermined rate, and when the adjustment time difference is within the allowable range of maintainable communication, the node 100c sets to the present node 100c a time obtained by adding the adjustment time difference to the reference time acquired from the node 100b.

In addition, for example, the node 100b measures a time difference between a reference time included in a time synchronization frame received from the node 100a and a reference time included in a time synchronization frame received from the node 100c. The node 100b calculates, when the time difference exceeds the allowable range of error, an adjustment time difference by multiplying the time difference by a predetermined rate. When the adjustment time difference calculated exceeds the allowable range of maintainable communication, the node 100b sets to the node 100b a time obtained by adding a time difference corresponding to the allowable range of maintainable communication in place of the adjustment time difference to the reference time acquired from the node 100a.

In this manner, in the present embodiment, each node 100 sets to the present node a time different from a reference time depending on a time difference with respect to a node adjacent thereto. Accordingly, in the present embodiment, node groups connected with different time synchronization sources can be gradually synchronized with each other in terms of a time and, at the same time, maintain communication between the respective nodes belonging to the same node group.

Figure 2:
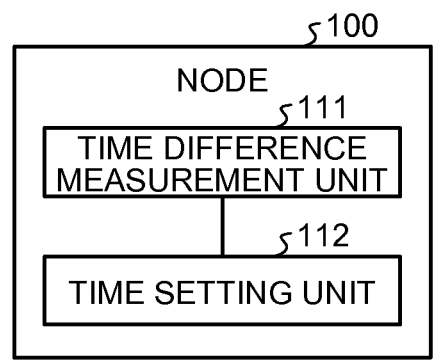
FIG. 2 is a view illustrating a constitution of a node according to the present embodiment.

Next, the constitution of the node 100 illustrated in FIG. 2 is explained. FIG. 2 is a view illustrating the constitution of the node according to the present embodiment. As illustrated in FIG. 2, the node 100 has a time difference measurement unit 111 and a time setting unit 112. Here, for the sake of simplicity, only the constitution related to time synchronization is illustrated.

The time difference measurement unit 111 measures, when receiving a time synchronization frame from a node adjacent thereto, a time difference that is a difference between a reference time included in the latest received time synchronization frame and a reference time included in the second-latest received time synchronization frame. Hereinafter, the reference time included in the latest received time synchronization frame is described as a first time, and the reference time included in the second-latest received time synchronization frame is described as a second time. The time difference measurement unit 111 outputs the time difference, which is measured thereby, between the first time and the second time to the time setting unit 112.

The time setting unit 112 accepts the time difference between the first time and the second time from the time difference measurement unit 111. The time setting unit 112 determines whether the time difference exceeds the allowable range of error that is smaller than the allowable range of maintainable communication, and sets a time different from a reference time to the present node 100 depending on the result of determination.

One example of such processing that the time setting unit 112 sets a time of the present node 100 is explained. First of all, the time setting unit 112 determines whether the time difference between the first time and the second time exceeds the allowable range of error that is smaller than the allowable range of maintainable communication. For example, the time setting unit 112 determines whether the time difference exceeds the allowable range of error by using the following expression (1).

$$\Delta T = |T1 - T2| > \Delta T err \quad (1)$$

Here, T1 is the first time, T2 is the second time, $\Delta T$ is the time difference, and $\Delta T err$ is the allowable range of error. For example, $\Delta T err = \Delta T com \times 2/100$, where $\Delta T com$ is the allowable range of maintainable communication.

The time setting unit 112 sets, when the result of determination indicates that the time difference does not exceed the allowable range of error, the second time to the present node 100. For example, the time setting unit 112 sets a time obtained by calculating the following expression (2) to the present node 100.

$$T\text{self} = T2 \quad (2)$$

Here, T2 is the second time, and Tself is the time of the present node 100.

The time setting unit 112 calculates, when the result of determination indicates that the time difference exceeds the allowable range of error, an adjustment time difference by multiplying the time difference by a predetermined rate. For example, the time setting unit 112 calculates the adjustment time difference by using the following expressions (3).

$$\Delta T cont = \alpha \times \Delta T = \alpha \times |T1 - T2| \quad (3)$$

Here, $\Delta T cont$ is the adjustment time difference, T1 is the first time, T2 is the second time, $\Delta T$ is the time difference, and $\alpha$ is an adjustment constant ($\alpha \le 1$).

The time setting unit 112 determines whether the adjustment time difference calculated exceeds the allowable range of maintainable communication. For example, the time setting unit 112 determines whether the adjustment time difference exceeds the allowable range of maintainable communication by using the following expressions (4).

$$\Delta T cont = \alpha \times \Delta T = \alpha \times |T1 - T2| > \Delta T com \quad (4)$$

Here, $\Delta T cont$ is the adjustment time difference, T1 is the first time, T2 is the second time, $\Delta T$ is the time difference, $\alpha$ is the adjustment constant ($\alpha \le 1$), and $\Delta T com$ is the allowable range of maintainable communication.

The time setting unit 112 calculates, when the result of determination indicates that the adjustment time difference does not exceed the allowable range of maintainable communication, a time obtained by adding/subtracting the adjustment time difference to/from the second time, and sets the time to the present node 100. For example, the time setting unit 112 calculates the time of the present node 100 by using the following expressions (5).

$$\text{When } T1 > T2, \quad (5)$$
$$T\text{self} = T2 + \Delta T\text{cont},$$
$$= T2 + \alpha|T1 - T2|.$$
$$\text{When } T1 < T2,$$
$$T\text{self} = T2 - \Delta T\text{cont},$$
$$= T2 - \alpha|T1 - T2|.$$

Here, Tself is the time of the present node 100, ΔTcont is the adjustment time difference, T1 is the first time, T2 is the second time, ΔT is the time difference, and α is the adjustment constant (α≤1).

On the other hand, when the result of determination indicates that the adjustment time difference exceeds the allowable range of maintainable communication, the time setting unit 112 calculates a time obtained by adding/subtracting a time difference corresponding to the allowable range of maintainable communication in place of the adjustment time difference to/from the second time, and sets the time to the present node 100. For example, the time setting unit 112 calculates the time of the present node 100 by using the following expressions (6).

$$\text{When } T1 > T2, T\text{self} = T2 + T\text{com}. \quad (6)$$

$$\text{When } T1 < T2, T\text{self} = T2 - T\text{com}.$$

Here, T1 is the first time, T2 is the second time, Tself is the time of the present node 100, and Tcom is the time difference corresponding to the allowable range of maintainable communication ΔTcom.

Here, each of the above-mentioned time difference measurement unit 111 and time setting unit 112 corresponds, for example, to an integrated device such as an application specific integrated circuit (ASIC) or a field programmable gate array (FPGA). Furthermore, each of the time difference measurement unit 111 and the time setting unit 112 corresponds, for example, to an electronic circuit such as a CPU or a micro processing unit (MPU).

Figure 3:
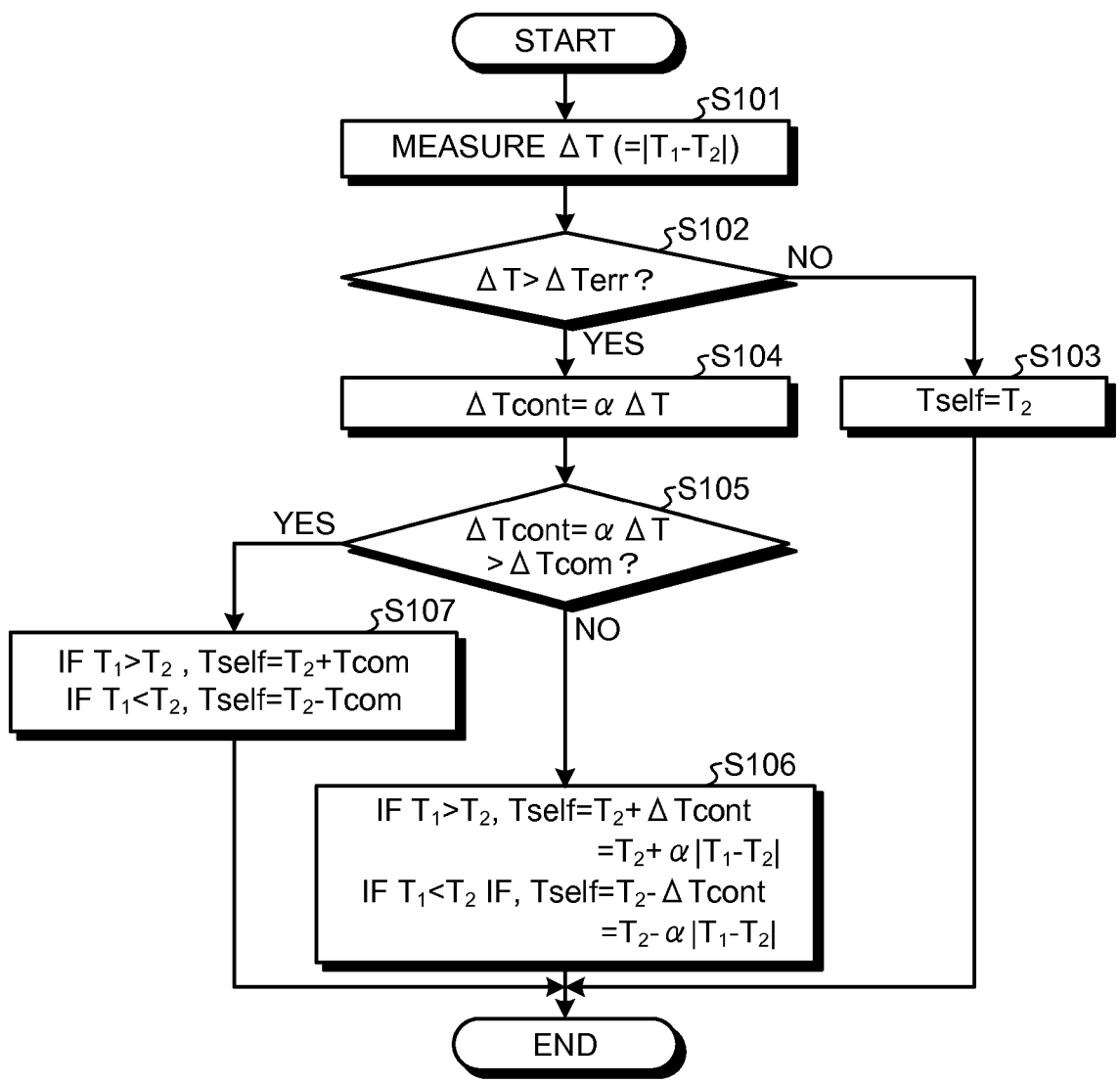
FIG. 3 is a flowchart illustrating procedures of a node according to the present embodiment.

Next, processing procedures of the node 100 according to the present embodiment is explained. FIG. 3 is a flowchart illustrating processing procedures of a node according to the present embodiment. For example, the processing illustrated in FIG. 3 is performed in response to the receipt of the time synchronization frame.

As illustrated in FIG. 3, the node 100 measures, when receiving the time synchronization frame from a node adjacent thereto, a time difference ΔT between the first time T1 and the second time T2 that are included in the time synchronization frame (Step S101).

The node 100 determines whether the time difference ΔT between the first time T1 and the second time T2 exceeds the allowable range of error ΔTerr (Step S102). The node 100 sets, when the time difference ΔT does not exceed the allowable range of error ΔTerr (No at S102), the second time T2 to the time Tself of the present node 100 (Step S103).

On the other hand, the node 100 calculates, when the time difference ΔT exceeds the allowable range of error ΔTerr (Yes at S102), the adjustment time difference ΔTcont by multiplying the time difference ΔT by an adjustment constant α (Step S104).

The node 100 determines whether the adjustment time difference ΔTcont exceeds the allowable range of maintainable communication ΔTcom (Step S105). The node 100 performs the following processing when the adjustment time difference ΔTcont does not exceed the allowable range of maintainable communication ΔTcom (No at S105). That is, the node 100 calculates a time obtained by adding/subtracting the adjustment time difference ΔTcont to/from the second time, and sets the time to the time Tself of the present node 100 (Step S106).

On the other hand, the node 100 performs the following processing when the adjustment time difference ΔTcont exceeds the allowable range of maintainable communication (Yes at S105). That is, the node 100 calculates a time obtained by adding/subtracting the time difference Tcom corresponding to the allowable range of maintainable communication ΔTcom to/from the second time T2, and sets the time to the time Tself of the present node 100 (Step S107).

Next, one example of such a series of processing steps that a node of an ad hoc network according to the present embodiment receives a time synchronization frame sequentially propagated from a time synchronization source and sets the time of the present node 100 is explained. FIG. 4 to FIG. 9 are views each illustrating one example of such processing that the node of the ad hoc network according to the present embodiment sets the time of the present node 100. In FIG. 4 to FIG. 9, an axis of ordinate indicates a time t.

Figure 4:
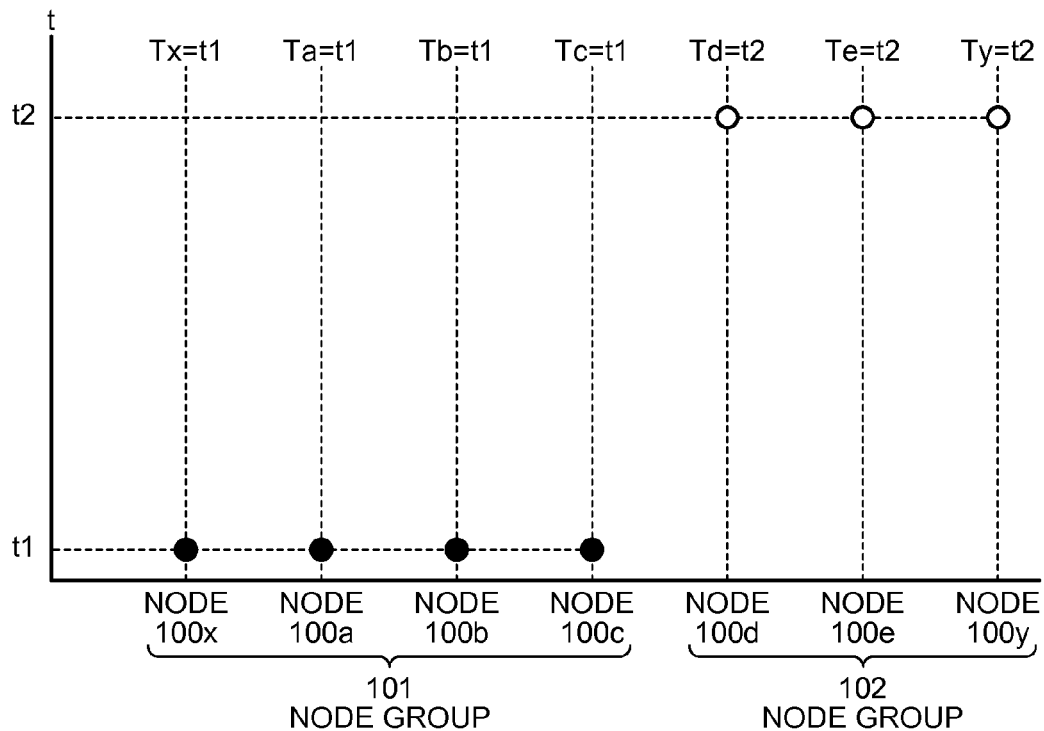
FIG. 4 is a view (No. 1) illustrating one example of processing that a node sets a time of the present node in the ad hoc network according to the present embodiment.

In a state illustrated in FIG. 4, the node group 101 is formed including the nodes 100a to 100c that are synchronized with the time synchronization source node 100x. That is, each of times Ta to Tc of the respective nodes 100a to 100c included in the node group 101 is identical with a time Tx (=t1) of the time synchronization source node 100x. Furthermore, in the ad hoc network, the node group 102 including the nodes 100d and 100e synchronized with the time synchronization source node 100y is formed. That is, each of times Td and Te of the respective nodes 100d and 100e included in the node group 102 is identical with a time Ty (=t2) of the time synchronization source node 100y. In addition, in a state illustrated in FIG. 4, the node 100c positioned at the boundary of the node group 101 and the node 100d positioned at the boundary of the node group 102 are isolated from each other in a wireless manner.

Figure 5:
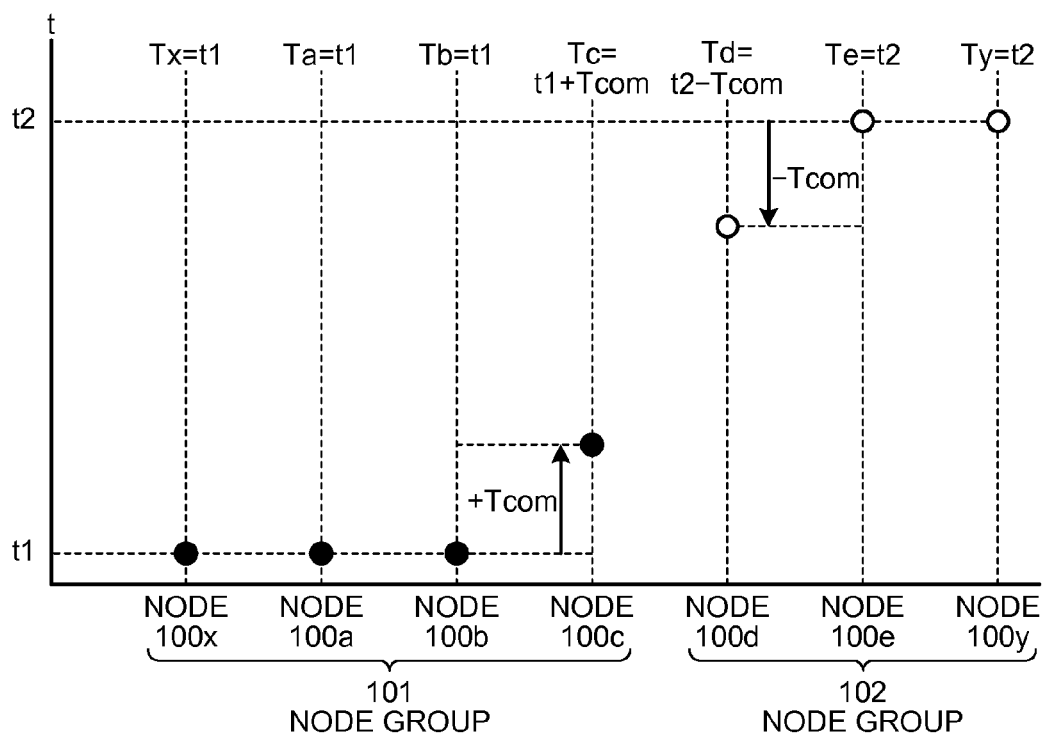
FIG. 5 is a view (No. 2) illustrating one example of processing that a node sets a time of the present node in the ad hoc network according to the present embodiment.

The case of the transition is considered from the above-mentioned state to a state that the node 100c positioned at the boundary of the node group 101 and the node 100d positioned at the boundary of the node group 102 are connectable with each other in a wireless manner. In this case, the node 100d transmits a time synchronization frame including the time Td (=t2) of the node 100d. The node 100c receives the time synchronization frame including the time Td (=t2) of the node 100d from the node 100d. The node 100c measures a time difference ΔT between the time Td (=t2) included in the time synchronization frame and the time Tc (=t1) of the present node 100c. The time difference ΔT (=|t1−t2|) exceeds the allowable range of error ΔTerr and hence, the node 100c calculates the adjustment time difference ΔTcont (=α·ΔT) by multiplying the time difference ΔT by the adjustment factor α (≤1). The adjustment time difference ΔTcont (=α·ΔT) exceeds the allowable range of maintainable communication ΔTcom and hence, as illustrated in FIG. 5, the node 100c calculates a time obtained by adding the time difference Tcom corresponding to the allowable range of maintainable communication ΔTcom to the time Tc (=t1) of the present node 100c. The node 100c overwrites the time Tc of the present node 100c with the calculated time (t1+Tcom). The node 100c transmits a time synchronization frame including the time Tc (=t1+Tcom) of the present node 100c.

On the other hand, the node 100d receives the time synchronization frame including the time Tc (=t1) of the node 100c from the node 100c. The node 100d measures a time difference ΔT between the time Tc (=t1) included in the time synchronization frame and the time Td (=t2) of the present node 100d. The time difference ΔT (=|t1−t2|) exceeds the allowable range of error ΔTerr and hence, the node 100d calculates the adjustment time difference ΔTcont (=α·ΔT) by multiplying the time difference ΔT by the adjustment factor α (≤1). The adjustment time difference ΔTcont (=α·ΔT) exceeds the allowable range of maintainable communication ΔTcom and hence, as illustrated in FIG. 5, the node 100d calculates a time obtained by subtracting the time difference Tcom corresponding to the allowable range of maintainable communication ΔTcom from the time Td (=t2) of the present node 100d. The node 100d overwrites the time Td of the present node 100d with the time (t2−Tcom) calculated. The node 100d transmits a time synchronization frame including the time Td (=t2−Tcom) of the present node 100d.

Subsequently, the node 100b receives the time synchronization frame including the time Tc (=t1+Tcom) of the node 100c from the node 100c. The node 100b measures a time difference ΔT between the time Tc (=t1+Tcom) included in the time synchronization frame and the time Tb (=t1) of the present node 100b. The time difference ΔT (=Tcom) exceeds the allowable range of error ΔTerr and hence, the node 100b calculates the adjustment time difference ΔTcont (=α·Tcom) by multiplying the time difference ΔT by the adjustment factor α (≤1). The adjustment time difference ΔTcont (=α·Tcom) does not exceed the allowable range of maintainable communication ΔTcom and hence, as illustrated in FIG. 6, the node 100b calculates a time obtained by adding the adjustment time difference ΔTcont (=α·Tcom) to the time Tb (=t1) of the present node 100b. The node 100b overwrites the time Tb of the present node 100b with the time (t1+α·Tcom) calculated. The node 100b transmits a time synchronization frame including the time Tb (=t1+α·Tcom) of the present node 100b.

On the other hand, the node 100e receives the time synchronization frame including the time Td (=t2−Tcom) of the node 100d from the node 100d. The node 100e measures a time difference ΔT between the time Td (=t2−Tcom) included in the time synchronization frame and the time Te (=t2) of the present node 100e. The time difference ΔT (=Tcom) exceeds the allowable range of error ΔTerr and hence, the node 100e calculates the adjustment time difference ΔTcont (=α·Tcom) by multiplying the time difference ΔT by the adjustment factor α. The adjustment time difference ΔTcont (=α·Tcom) does not exceed the allowable range of maintainable communication ΔTcom and hence, as illustrated in FIG. 6, the node 100e calculates a time obtained by subtracting the adjustment time difference ΔTcont (=α·Tcom) from the time Te (=t2) of the present node 100e. The node 100e overwrites the time Te of the present node 100e with the calculated time (t2−α·Tcom). The node 100e transmits a time synchronization frame including the time Te (=t2−α·Tcom) of the present node 100e.

Subsequently, the node 100a receives the time synchronization frame including the time Tb (=t1+α·Tcom) of the node 100b from the node 100b. The node 100a measures a time difference ΔT between the time Tb (=t1+α·Tcom) included in the time synchronization frame and the time Ta (=t1) of the present node 100a. The time difference ΔT (=α·Tcom) exceeds the allowable range of error ΔTerr and hence, the node 100a calculates the adjustment time difference ΔTcont (=α²·Tcom) by multiplying the time difference ΔT by the adjustment factor α. The adjustment time difference ΔTcont (=α²·Tcom) does not exceed the allowable range of maintainable communication ΔTcom and hence, as illustrated in FIG. 7, the node 100a calculates a time obtained by adding the adjustment time difference ΔTcont to the time Ta (=t1) of the present node 100a. The node 100a overwrites the time Ta of the present node 100a with the calculated time (t1+α²·Tcom). The node 100a transmits the time synchronization frame including the time Ta (=t1+α²·Tcom) of the present node 100a.

On the other hand, the time synchronization source node 100y receives the time synchronization frame including the time Te (=t2−α·Tcom) of the node 100e from the node 100e. The time synchronization source node 100y measures a time difference ΔT between the time Te (=t2−α·Tcom) included in the time synchronization frame and the time Ty (=t2) of the present node 100y. The time difference ΔT (=α·Tcom) exceeds the allowable range of error ΔTerr and hence, the time synchronization source node 100y calculates an adjustment time difference ΔTcont (=α²·Tcom) by multiplying the time difference ΔT by the adjustment factor α. The adjustment time difference ΔTcont (=α²·Tcom) does not exceed the allowable range of maintainable communication ΔTcom and hence, as illustrated in FIG. 7, the time synchronization source node 100y calculates a time obtained by subtracting the adjustment time difference ΔTcont from the time Ty (=t2) of the present node 100y. The time synchronization source node 100y overwrites the time Ty of the present node 100y with the calculated time (t2−α²·Tcom).

Figure 8:
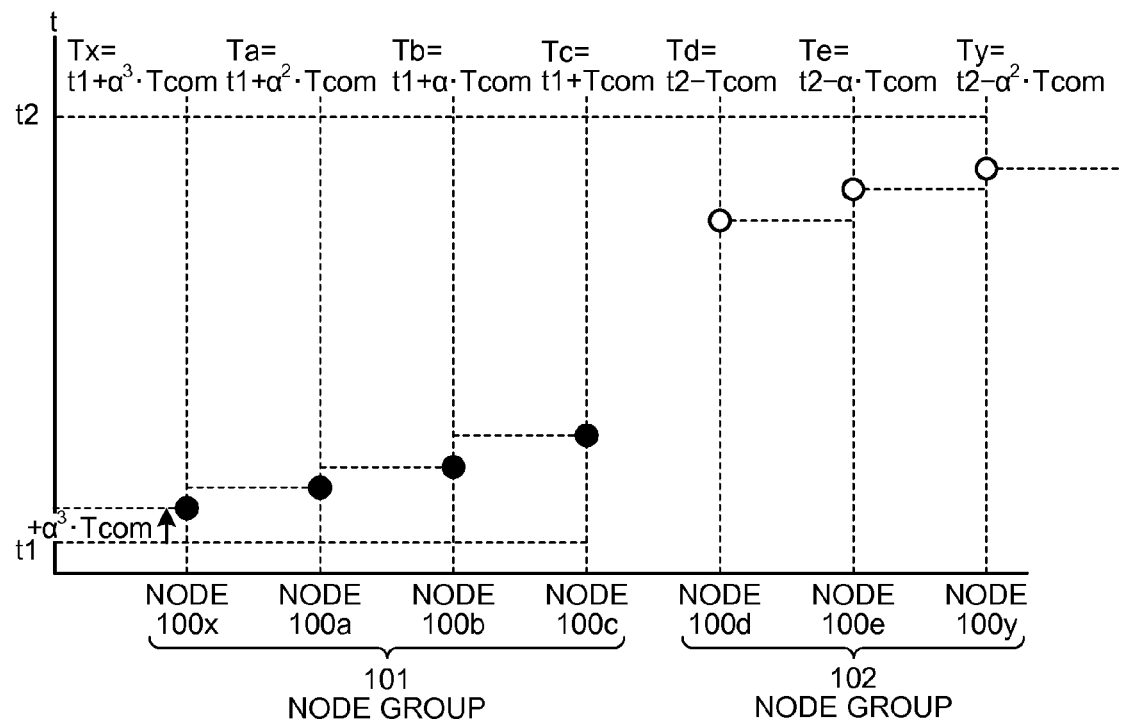
FIG. 8 is a view (No. 5) illustrating one example of processing that a node sets a time of the present node in the ad hoc network according to the present embodiment.

Subsequently, the time synchronization source node 100x receives the time synchronization frame including the time Ta (=t1+α²·Tcom) of the node 100a from the node 100a. The time synchronization source node 100x measures a time difference ΔT between the time Ta (=t1+α²·Tcom) included in the time synchronization source frame and the time Tx (=t1) of the present node 100x. The time difference ΔT (=α2·Tcom) exceeds the allowable range of error ΔTerr and hence, the time synchronization source node 100x calculates the adjustment time difference ΔTcont (=α³·Tcom) by multiplying the time difference ΔT by the adjustment factor α. The adjustment time difference ΔTcont (=α³·Tcom) does not exceed the allowable range of maintainable communication ΔTcom and hence, as illustrated in FIG. 8, the time synchronization source node 100x calculates a time obtained by adding the adjustment time difference ΔTcont to the time Tx (=t1) of the present node 100x. The time synchronization source node 100x overwrites the time Tx of the present node 100x with the calculated time (t1+α³·Tcom).

Figure 9:
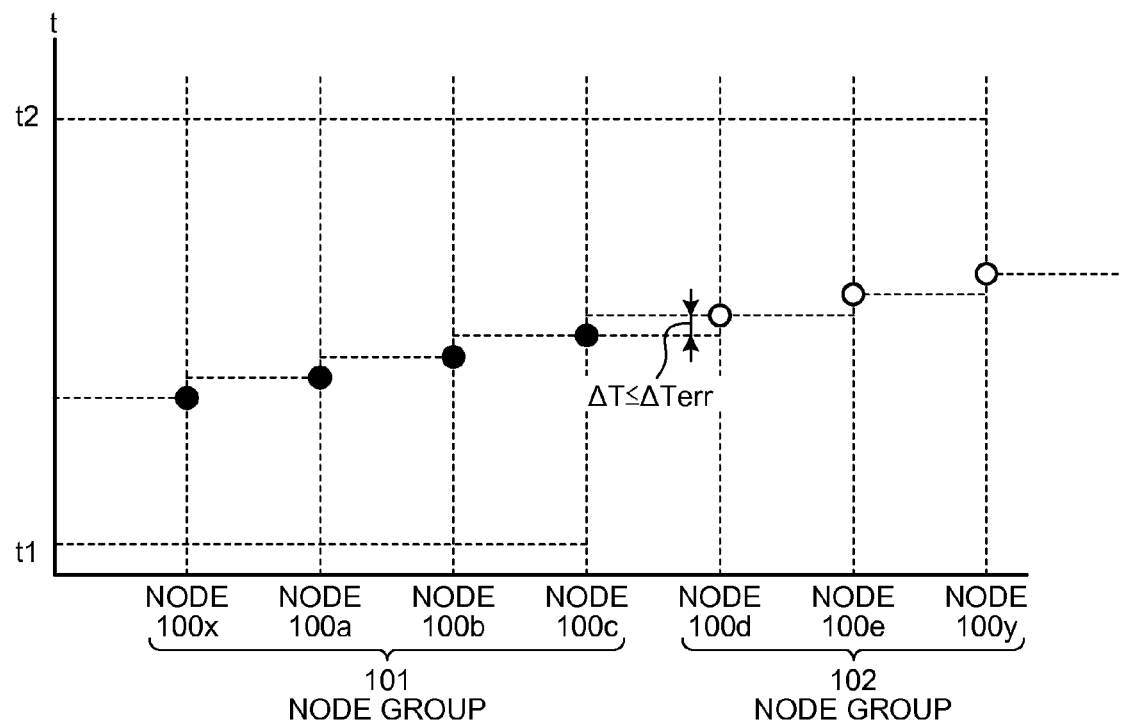
FIG. 9 is a view (No. 6) illustrating one example of processing that a node sets a time of the present node in the ad hoc network according to the present embodiment.

The processing illustrated in FIG. 5 to FIG. 8 is repeatedly performed. Thus, the time difference ΔT between times of nodes adjacent to each other is, as illustrated in FIG. 9, limited within the allowable range of error ΔTerr.

Next, another example of such a series of processing steps that a node of an ad hoc network according to the present embodiment receives a time synchronization frame sequentially propagated from a time synchronization source and sets a time of the present node is explained. FIG. 10 to FIG. 15 are views each illustrating another example of such processing that the node of the ad hoc network according to the present embodiment sets a time of the present node. In FIG. 10 to FIG. 15, an axis of ordinate indicates a time t.

Here, the examples illustrated in FIG. 10 to FIG. 15 are different from the examples illustrated in FIG. 4 to FIG. 9 in that the adjustment time difference ΔTcont calculated by the node 100c of the node group 101 and the node 100d of the node group 102 does not exceed the allowable range of maintainable communication ΔTcom.

Figure 10:
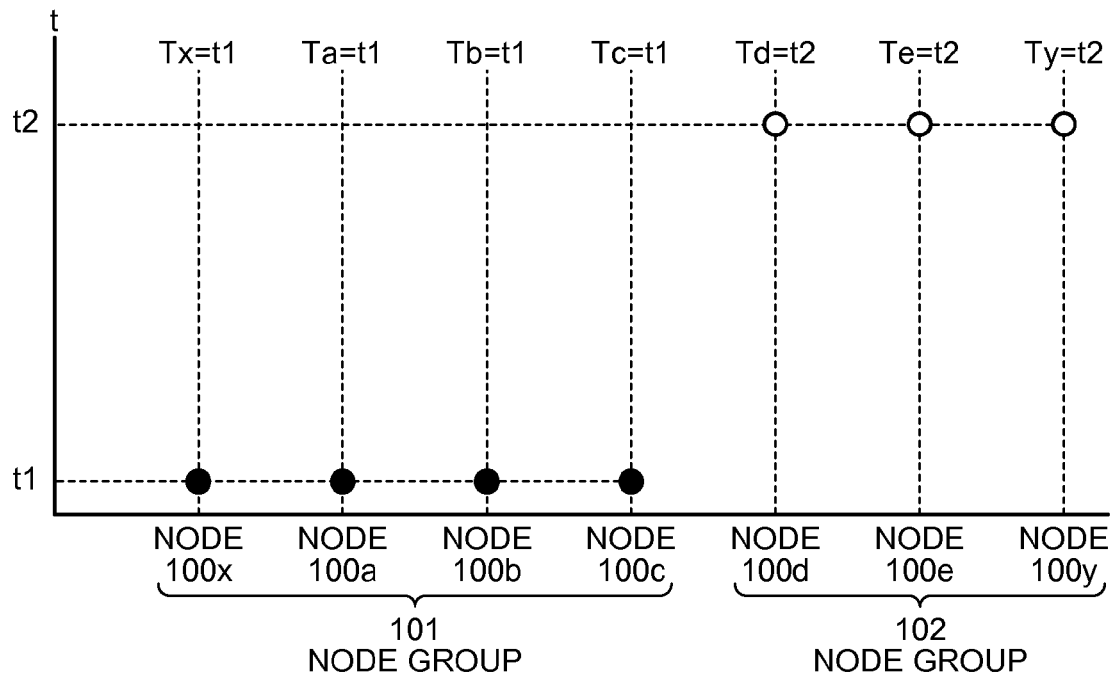
FIG. 10 is a view (No. 1) illustrating another example of processing that a node sets a time of the present node in the ad hoc network according to the present embodiment.

In a state illustrated in FIG. 10, the node group 101 including the nodes 100a to 100c that are synchronized with the time synchronization source node 100x is formed. That is, each of times Ta to Tc of the respective nodes 100a to 100c included in the node group 101 is identical with the time Tx (=t1) of the time synchronization source node 100x. In the ad hoc network, the node group 102 including the nodes 100d and 100e synchronized with the time synchronization source node 100y is formed. That is, each of times Td and Te of the respective nodes 100d and 100e included in the node group 102 is identical with the time Ty (=t2) of the time synchronization source node 100y. In addition, in a state illustrated in FIG. 10, the node 100c positioned at the boundary of the node group 101 and the node 100d positioned at the boundary of the node group 102 are isolated from each other in a wireless manner.

Figure 11:
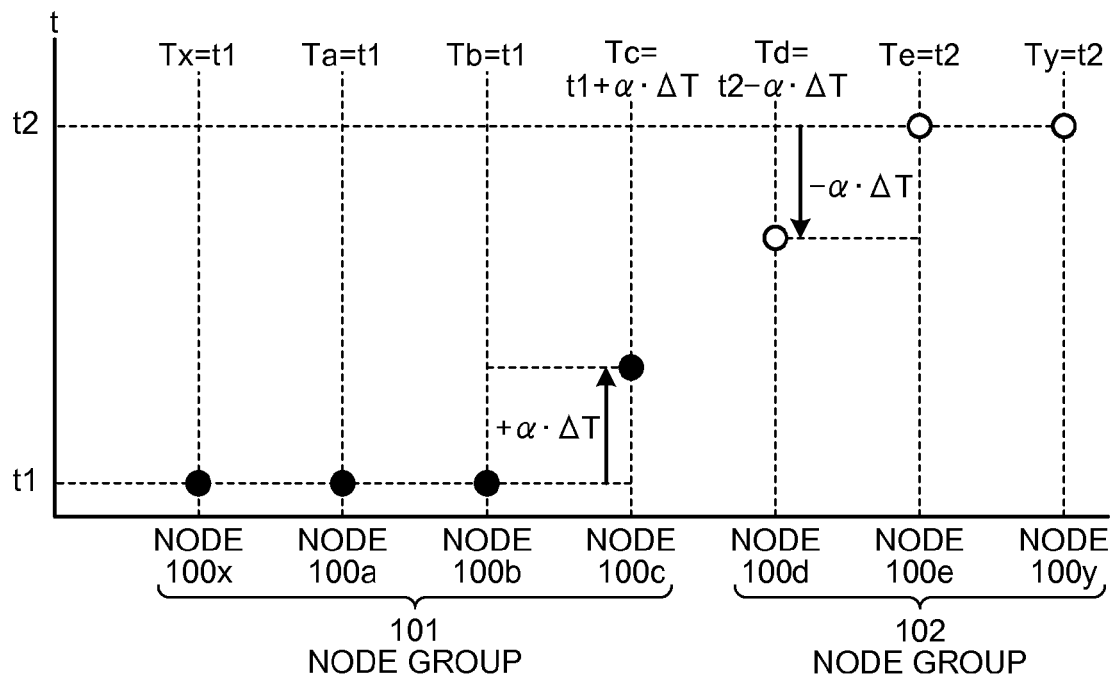
FIG. 11 is a view (No. 2) illustrating still another example of processing that a node sets a time of the present node in the ad hoc network according to the present embodiment.

The case of the transition is considered from the above-mentioned state to a state that the node 100c positioned at the boundary of the node group 101 and the node 100d positioned at the boundary of the node group 102 become connectable with each other in a wireless manner. In this case, the node 100d transmits a time synchronization frame including the time Td (=t2) of the present node 100d. The node 100c receives the time synchronization frame including the time Td (=t2) of the node 100d from the node 100d. The node 100c measures a time difference ΔT between the time Td (=t2) included in the time synchronization frame and the time Tc (=t1) of the present node 100c. The time difference ΔT (=|t1−t2|) exceeds the allowable range of error ΔTerr and hence, the node 100c calculates the adjustment time difference ΔTcont (=α·ΔT) by multiplying the time difference ΔT by the adjustment factor α (≤1). The adjustment time difference ΔTcont (=α·ΔT) does not exceed the allowable range of maintainable communication ΔTcom and hence, as illustrated in FIG. 11, the node 100c calculates a time obtained by adding the adjustment time difference ΔTcont (=α·ΔT) to the time Tc (=t1) of the present node 100c. The node 100c overwrites the time Tc of the present node 100c with the calculated time (t1+α·ΔT). The node 100c transmits a time synchronization frame including the time Tc (=t1+α·ΔT) of the present node 100c.

On the other hand, the node 100d receives the time synchronization frame including the time Tc (=t1) of the node 100c from the node 100c. The node 100d measures a time difference ΔT between the time Tc (=t1) included in the time synchronization frame and the time Td (=t2) of the present node 100d. The time difference ΔT (=|t1−t2|) exceeds the allowable range of error ΔTerr and hence, the node 100d calculates the adjustment time difference ΔTcont (=α·ΔT) by multiplying the time difference ΔT by the adjustment factor α (≤1). The adjustment time difference ΔTcont (=α·ΔT) does not exceed the allowable range of maintainable communication ΔTcom and hence, as illustrated in FIG. 11, the node 100d calculates a time obtained by subtracting the adjustment time difference ΔTcont (=α·ΔT) from the time Td (=t2) of the present node 100d. The node 100d overwrites the time Td of the present node 100d with the calculated time (t1−α·ΔT). The node 100d transmits a time synchronization frame including the time Td (=t1−α·ΔT) of the present node 100d.

Figure 12:
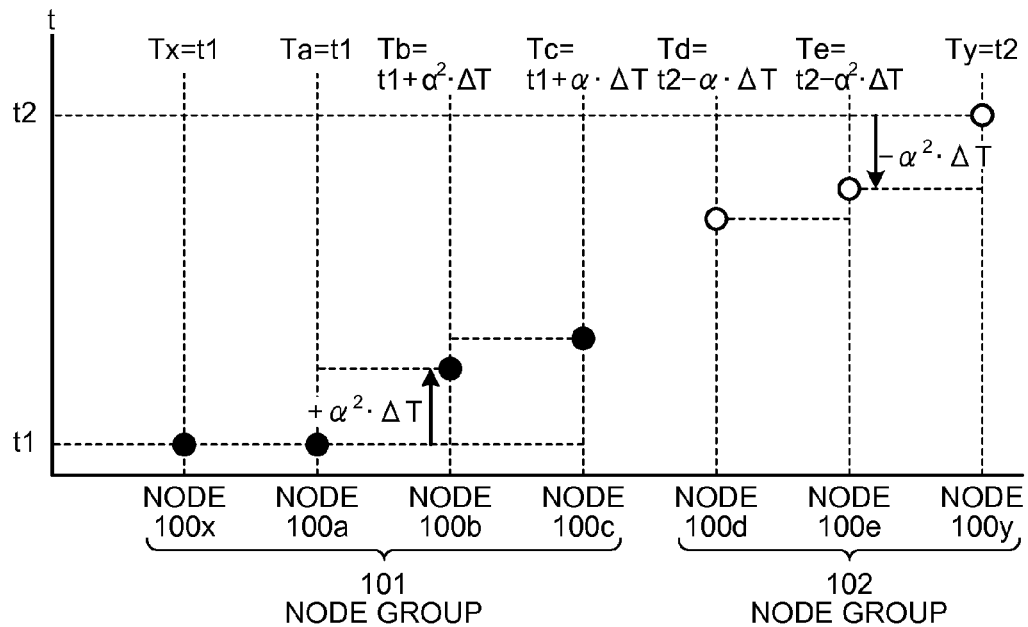
FIG. 12 is a view (No. 3) illustrating still another example of processing that a node sets a time of the present node in the ad hoc network according to the present embodiment.

Subsequently, the node 100b receives the time synchronization frame including the time Tc (=t1+α·ΔT) of the node 100c from the node 100c. The node 100b measures a time difference α·ΔT between the time Tc (=t1+α·ΔT) included in the time synchronization frame and the time Tb (=t1) of the present node 100b. The time difference α·ΔT exceeds the allowable range of error ΔTerr and hence, the node 100b calculates an adjustment time difference ΔTcont (=Δ²·ΔT) by multiplying the time difference ΔT by the adjustment factor α (≤1). The adjustment time difference ΔTcont (=Δ²·ΔT) does not exceed the allowable range of maintainable communication ΔTcom and hence, as illustrated in FIG. 12, the node 100b calculates a time obtained by adding the adjustment time difference ΔTcont (=Δ²·ΔT) to the time Tb (=t1) of the present node 100b. The node 100b overwrites the time Tb of the present node 100b with the calculated time (t1+Δ²·ΔT). The node 100b transmits a time synchronization frame including the time Tb (=t1+Δ²·ΔT) of the present node 100b.

On the other hand, the node 100e receives the time synchronization frame including the time Td (=t2−α·ΔT) of the node 100d from the node 100d. The node 100e measures a time difference α·ΔT between the time Td (=t2−α·ΔT) included in the time synchronization frame and the time Te (=t2) of the present node 100e. The time difference α·ΔT exceeds the allowable range of error ΔTerr and hence, the node 100e calculates an adjustment time difference ΔTcont (=Δ²·ΔT) by multiplying the time difference α·ΔT by the adjustment factor α. The adjustment time difference ΔTcont (=Δ²·ΔT) does not exceed the allowable range of maintainable communication ΔTcom and hence, as illustrated in FIG. 12, the node 100e calculates a time obtained by subtracting the adjustment time difference ΔTcont (=Δ²·ΔT) from the time Te (=t2) of the present node 100e. The node 100e overwrites the time Te of the present node 100e with the calculated time (t2−Δ²·ΔT). The node 100e transmits a time synchronization frame including the time Te (=t2−Δ²·ΔT) of the present node 100e.

Figure 13:
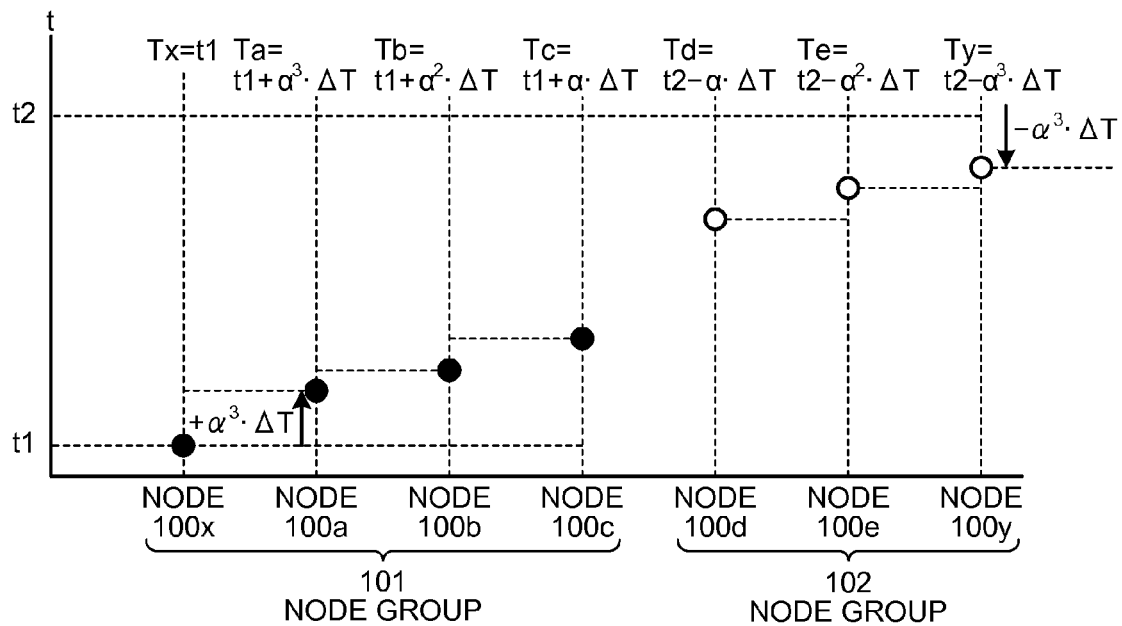
FIG. 13 is a view (No. 4) illustrating still another example of processing that a node sets a time of the present node in the ad hoc network according to the present embodiment.

Subsequently, the node 100a receives the time synchronization frame including the time Tb (=t1+Δ²·ΔT) of the node 100b from the node 100b. The node 100a measures the time difference Δ²·ΔT between the time Tb (=t1+Δ²·ΔT) included in the time synchronization frame and the time Ta (=t1) of the present node 100a. The time difference α2·ΔT exceeds the allowable range of error ΔTerr and hence, the node 100a calculates an adjustment time difference ΔTcont (=Δ³·ΔT) by multiplying the time difference Δ²·ΔT by the adjustment factor α. The adjustment time difference ΔTcont (=Δ³·ΔT) does not exceed the allowable range of maintainable communication ΔTcom and hence, as illustrated in FIG. 13, the node 100a calculates a time obtained by adding the adjustment time difference ΔTcont to the time Ta (=t1) of the present node 100a. The node 100a overwrites the time Ta of the present node 100a with the time (t1+Δ³·ΔT) calculated. The node 100a transmits a time synchronization frame including the time Ta (=t1+Δ³·ΔT) of the present node 100a.

On the other hand, the time synchronization source node 100y receives the time synchronization frame including the time Te (=t2−Δ²·ΔT) of the node 100e from the node 100e. The time synchronization source node 100y measures the time difference Δ²·ΔT between the time Te (=t2−Δ²·ΔT) included in the time synchronization frame and the time Ty (=t2) of the present node 100y. The time difference Δ²·ΔT exceeds the allowable range of error ΔTerr and hence, the time synchronization source node 100y calculates the adjustment time difference ΔTcont (=Δ³·ΔT) by multiplying the time difference Δ²·ΔT by the adjustment factor α. The adjustment time difference ΔTcont ($=\Delta^3 \cdot \Delta T$) does not exceed the allowable range of maintainable communication ΔTcom and hence, as illustrated in FIG. 13, the time synchronization source node 100y calculates a time obtained by subtracting the adjustment time difference ΔTcont from the time Ty ($=t2$) of the present node 100y. The time synchronization source node 100y overwrites the time Ty of the present node 100y with the calculated time ($t2-\Delta^3 \cdot \Delta T$).

Figure 14:
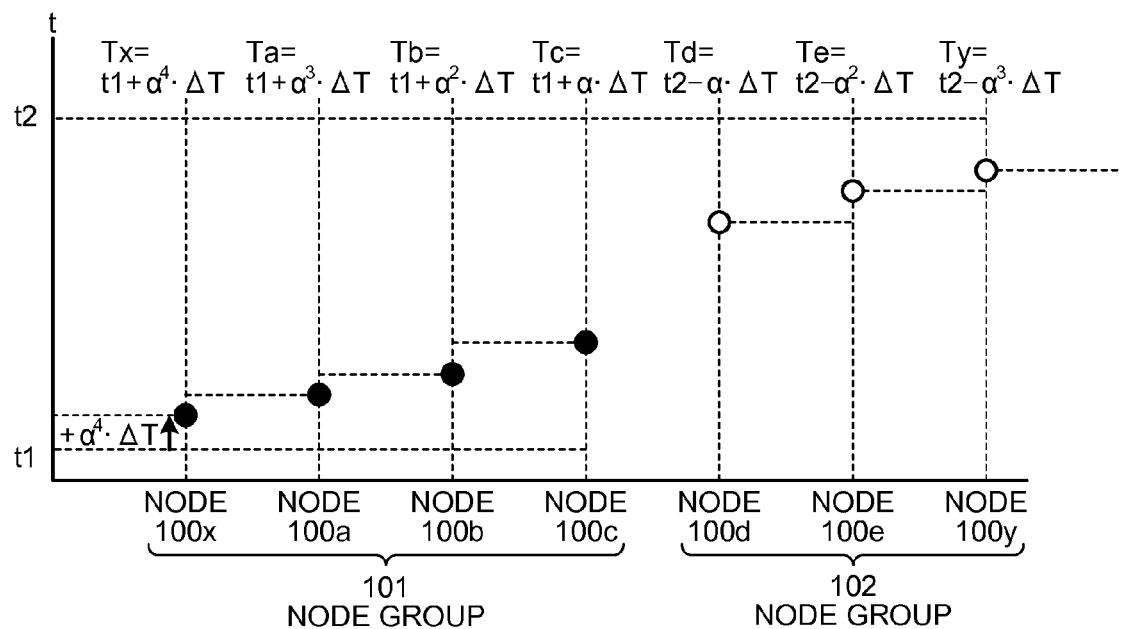
FIG. 14 is a view (No. 5) illustrating still another example of processing that a node sets a time of the present node in the ad hoc network according to the present embodiment.

Subsequently, the time synchronization source node 100x receives the time synchronization frame including the time Ta ($=t1+\Delta^3 \cdot \Delta T$) of the node 100a from the node 100a. The time synchronization source node 100x measures a time difference $\Delta^3 \cdot \Delta T$ between the time Ta ($=t1+\alpha^3 \cdot \Delta T$) included in the time synchronization source frame and the time Tx ($=t1$) of the present node 100x. The time difference $\Delta^3 \cdot \Delta T$ exceeds the allowable range of error ΔTerr and hence, the time synchronization source node 100x calculates the adjustment time difference ΔTcont ($=\alpha^4 \cdot \Delta T$) by multiplying the time difference ΔT by the adjustment factor α. The adjustment time difference ΔTcont ($=\alpha^4 \cdot \Delta T$) does not exceed the allowable range of maintainable communication ΔTcom and hence, as illustrated in FIG. 14, the time synchronization source node 100x calculates a time obtained by adding the adjustment time difference ΔTcont to the time Tx ($=t1$) of the present node 100x. The time synchronization source node 100x overwrites the time Tx of the present node 100x with the calculated time ($t1+\alpha^4 \cdot \Delta T$).

Figure 15:
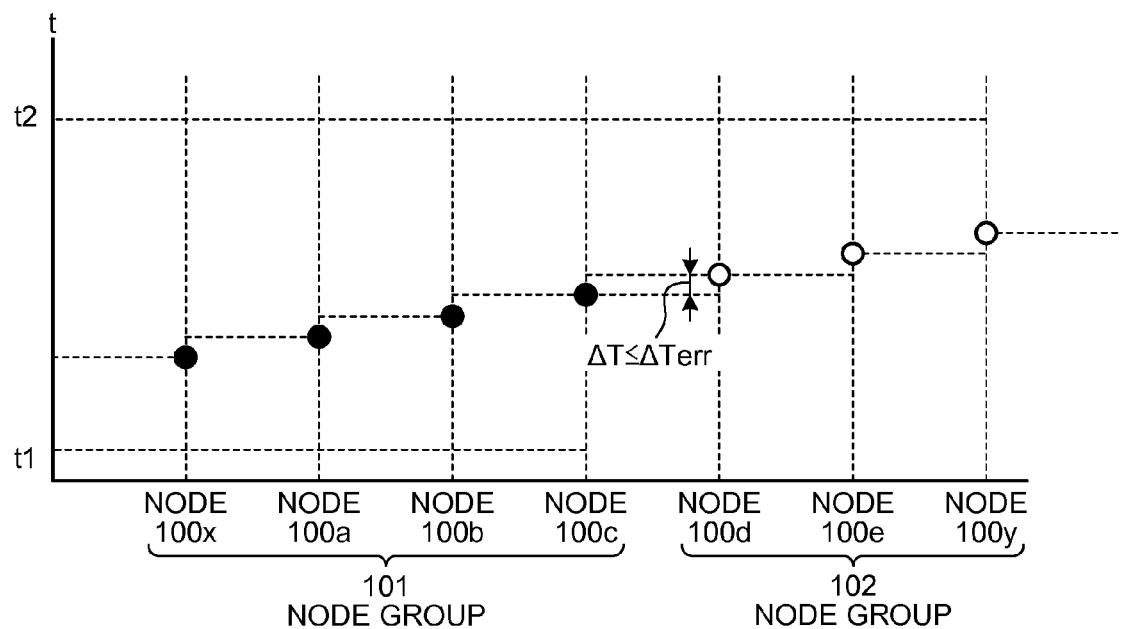
FIG. 15 is a view (No. 6) illustrating still another example of processing that a node sets a time of the present node in the ad hoc network according to the present embodiment.

The processing illustrated in FIG. 10 to FIG. 14 is repeatedly performed. Thus, the time difference ΔT between times of nodes adjacent to each other is, as illustrated in FIG. 15, limited within the allowable range of error ΔTerr.

Next, the advantageous effect of the ad hoc network according to the present embodiment is explained. The node 100 included in the ad hoc network measures a time difference between a time included in latest time information received from a node adjacent thereto and a time included in second-latest time information received from the node adjacent thereto, the node being synchronized with a time synchronization source. Furthermore, the node 100 determines whether the time difference exceeds an allowable range of error that is smaller than an allowable range of maintainable communication, and sets the time of the present node to a time different from the reference time depending on the result of determination. That is, the node 100 calculates, when the time difference exceeds the allowable range of error, an adjustment time difference by multiplying the time difference by an adjustment factor. When the adjustment time difference calculated is within the allowable range of maintainable communication, the node 100 overwrites and sets the time of the present node 100 with a time obtained by adding the adjustment time difference to the time of the present node 100. On the other hand, when the adjustment time difference calculated exceeds the allowable range of maintainable communication, the node 100 overwrites and sets the time of the present node 100 with a time obtained by adding a time difference corresponding to the allowable range of maintainable communication in place of the adjustment time difference to the time of the present node 100. Accordingly, in the ad hoc network according to the present embodiment, node groups connected with different time synchronization sources can be gradually synchronized with each other in terms of a time and, at the same time, maintain communication between the respective nodes belonging to the same node group.

According to one embodiment of a node disclosed in the present application, it is possible to achieve an advantageous effect that node groups connected with different time synchronization sources are gradually synchronized in terms of a time with each other and, at the same time, communication between the respective nodes belonging to the same node group is maintainable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A node in an ad hoc network constituted of nodes each of which sets a time thereof based on time information propagated sequentially from a time synchronization source, the node comprising:
    a memory; and
    a processor coupled to the memory, wherein
    the processor is configured to execute a process including:
        measuring a time difference that is a difference between a first time based on latest time information received by the node and a second time based on second-latest time information received by the node; and
        calculating an adjustment time difference by multiplying the time difference by a predetermined rate when the time difference exceeds a first time range, the first time range being smaller than a second time range, the second time range indicating a range of the time difference in which communication with an adjacent node is maintained, setting, to a time of the node, a third time obtained by adding the calculated adjustment time difference and the second time when the calculated adjustment time difference is within the second time range, and setting, to a time of the node, a fourth time obtained by adding another time difference different from the time difference and corresponding to the second time range in place of the calculated adjustment time difference and the second time when the calculated adjustment time difference exceeds the second time range.

2. A method for communication control performed by a node in an ad hoc network constituted of nodes each of which sets a time thereof based on time information propagated sequentially from a time synchronization source to execute a process comprising:
    measuring a time difference that is a difference between a first time based on latest time information received by the node and a second time based on second-latest time information received by the node;
    calculating an adjustment time difference by multiplying the time difference by a predetermined rate when the time difference exceeds a first time range, the first time range being smaller than a second time range, the second time range indicating a range of the time difference in which communication with an adjacent node is maintained; and
    setting, to a time of the node, a third time obtained by adding the calculated adjustment time difference and the second time when the calculated adjustment time difference is within the second time range, and setting, to a time of the node, a fourth time obtained by adding another time difference different from the time difference and corresponding to the second time range in place of the calculated adjustment time difference and the second time when the calculated adjustment time difference exceeds the second time range.

* * * * *